No. 682,855. Patented Sept. 17, 1901.
G. LUCAS.
BOTTLE.
(Application filed June 14, 1901.)
(No Model.) 2 Sheets—Sheet 1.

WITNESSES:
Fred White
Dominic N. Maria

INVENTOR:
George Lucas,
By Attorneys,

THE NORRIS PETERS CO., PHOTO-LITHO., WASHINGTON, D. C.

No. 682,855. Patented Sept. 17, 1901.
G. LUCAS.
BOTTLE.
(Application filed June 14, 1901.)
(No Model.) 2 Sheets—Sheet 2.
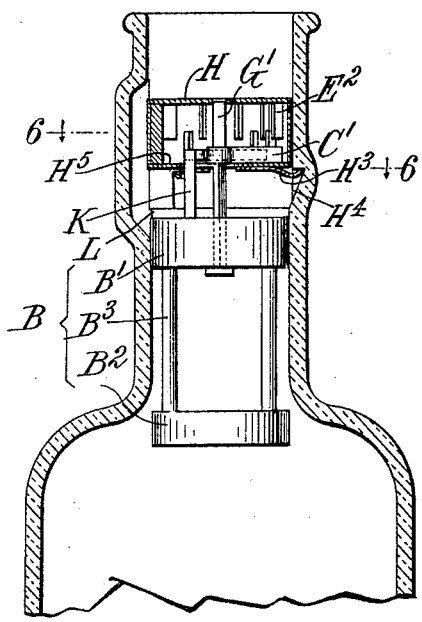
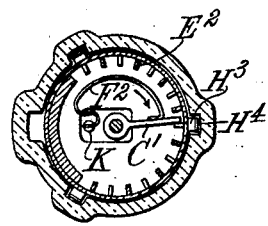
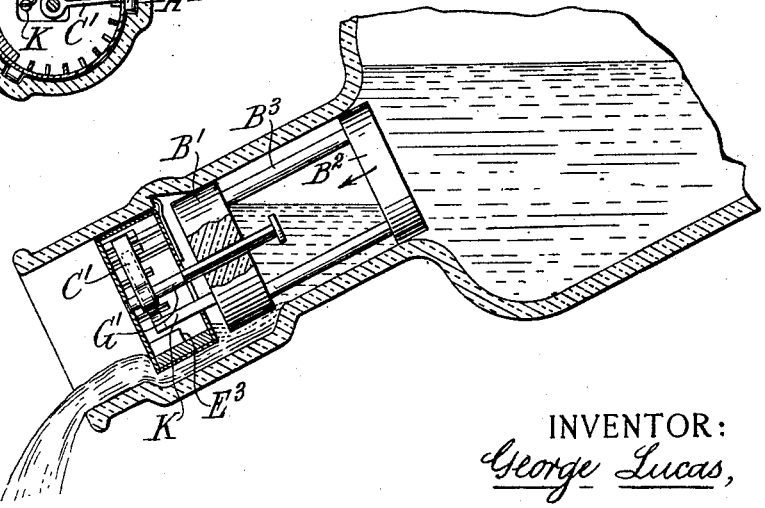
WITNESSES:
INVENTOR:
George Lucas,
By Attorneys,

UNITED STATES PATENT OFFICE.

GEORGE LUCAS, OF BROOKLYN, NEW YORK.

BOTTLE.

SPECIFICATION forming part of Letters Patent No. 682,855, dated September 17, 1901.

Application filed June 14, 1901. Serial No. 64,545. (No model.)

*To all whom it may concern:*

Be it known that I, GEORGE LUCAS, a citizen of the United States, residing in the borough of Brooklyn, county of Kings, city and State of New York, have invented certain new and useful Improvements in Bottles, of which the following is a specification.

My invention aims to provide an improved bottle adapted primarily to prevent refilling after the liquid originally sold has been used up.

My invention aims also to provide a bottle which measures the quantity which may be poured out at each inversion of the bottle and in which the number of drinks which can be poured out is limited.

My invention aims to provide also various improvements in detail, set forth specifically in the following description.

Figure 1:
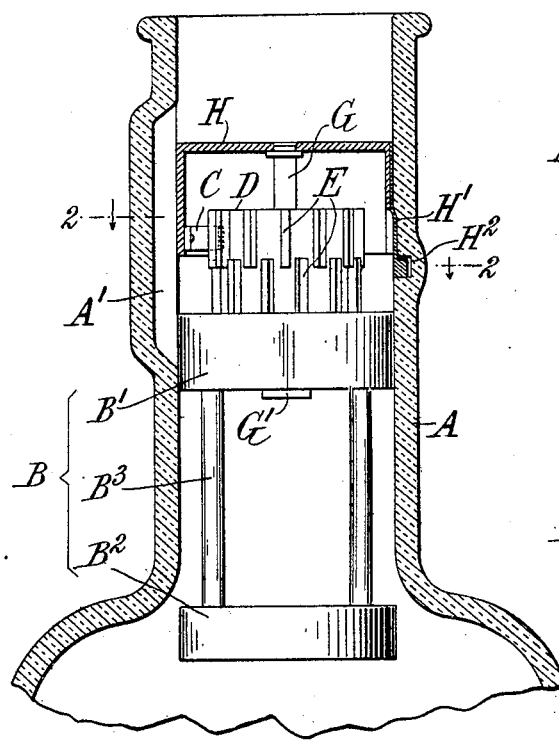
Figure 2:
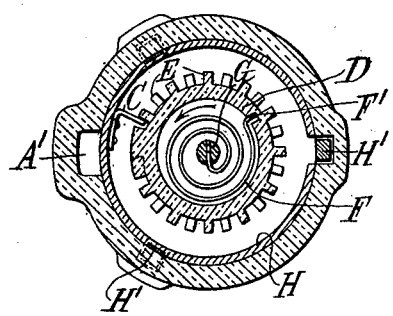
Figure 3:
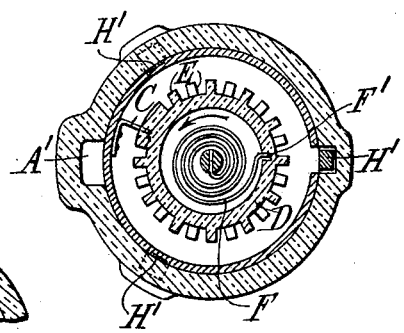
Figure 4:
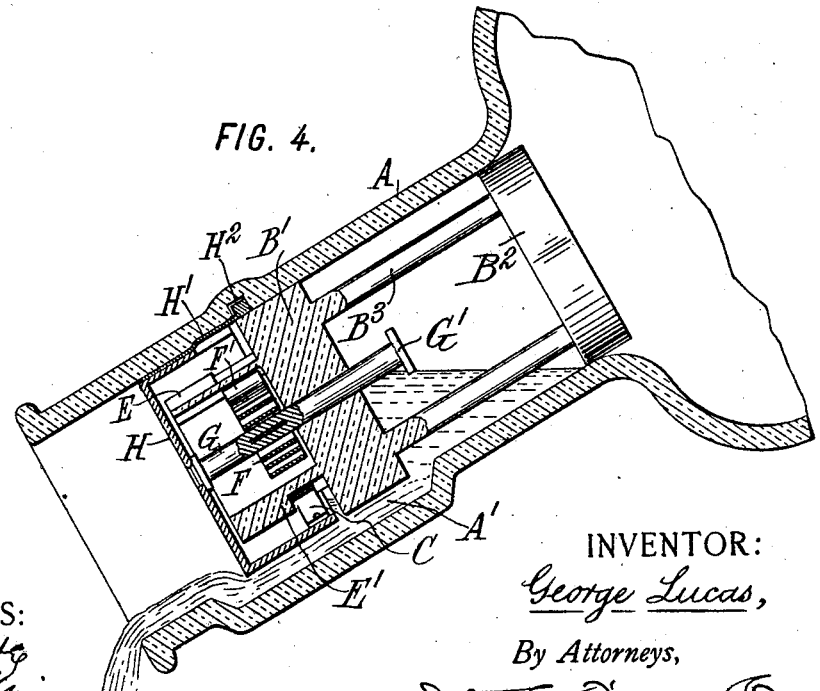

Referring now to the accompanying drawings, representing certain embodiments of my invention, Figure 1 is a diametral section through a bottle-neck, showing the internal parts in elevation. Figs. 2 and 3 are cross-sections on the line 2 2 of Fig. 1, showing respectively the parts in the position occupied when the bottle is full and in the position occupied when as many drinks have been poured as are possible. Fig. 4 is a section similar to Fig. 1, showing the bottle inverted for the purpose of pouring out a drink. Fig. 5 is a view similar to Fig. 1 of a modified embodiment of my invention. Fig. 6 is a cross-section of Fig. 5 approximately on the line 6 6 thereof. Fig. 7 is a view of the embodiment shown in Fig. 5, the bottle being inverted to pour out the liquid. Fig. 8 is development of a part of the apparatus of Fig. 5, showing a series of stops used. Fig. 9 is a diametral illustration of a modification. Fig. 10 is a view of an embodiment somewhat similar to Fig. 5, the bottle not being shown. Fig. 11 is a cross-section of Fig. 10, and Fig. 12 is a view similar to Fig. 10 with the parts in a different position.

An important feature of my invention is that it operates to prevent refilling of the bottle by making it impossible to pour out more than a certain predetermined number of drinks. This predetermined number of drinks being made slightly larger than the average number of drinks in a bottle of given size, as soon as the original contents of the bottle are all poured out it will be useless to refill it, as it would be impossible to pour out the refilled liquid. The preferable arrangement for this purpose consists in providing a stopper which at each inversion of the bottle is alternated from and back to the stoppering position and in providing means for automatically holding the same in the stoppering position after a predetermined number of alternations, so that no more liquid can be poured out of the bottle. It is advisable in connection with such an arrangement to provide that only a measured quantity shall be permitted to escape from the bottle at each inversion thereof, the quantity of course depending on the nature of the liquid generally to be carried in a bottle. This is provided for by making the stopper double, composed of two members connected to each other, with an intermediate space, and so arranged that by their movement in the neck of the bottle the space between them is connected alternately with the interior and the exterior of the bottle.

Referring to the drawings, A indicates a bottle-neck of the common form, except for certain variations, which will be referred to hereinafter. In this neck is a stopper of any suitable construction, which as a whole I designate B. In the form shown this stopper consists of a member reciprocating in the neck of the bottle; but any sort of stopper which alternately opens and stoppers the outlet might be arranged to operate in the manner contemplated by my invention. In the position of Fig. 1 the outlet is stoppered, while in that of Fig. 4 it is open. In its preferred form this stopper is double, being composed of the members B' and $B^2$, which are substantially close-fitting pistons connected together, but spaced apart from each other by members $B^3$, the members B' sliding in the bore of the neck A. In the upright position of the bottle the member $B^2$ is below the neck, and the liquid is free to enter the space between the members B' and $B^2$ as soon as the bottle is inverted. Upon such inversion the liquid first enters the space between B' and $B^2$, and then the entire stopper is forced down to the position of Fig. 4, in which position the space between the members B' and B² communicates with the outlet-passage A', which may lead around the controlling mechanism or may lead directly to a side outlet, or according to any other desired arrangement. In the position of Fig. 4 the liquid which filled the space between the members B' and B² of the stopper can be emptied, but no further liquid from the bottle can enter the space between the stopper members nor in any other way find its way to the outlet. If by any means whatever liquid is forced into the bottle through the neck thereof, it can only be by reciprocating the stopper B, so as to let the liquid first into the space between the members B' and B² and then into the bottle. This reciprocation accomplishes the same result as would the pouring of drinks—that is, it operates the mechanism which after a certain number of operations prevents further pouring from the bottle and destroys the usefulness of refilling. Any other means of measuring the quantity which is permitted to escape from the bottle at one inversion of the same may be used in connection with the means for stoppering the bottle entirely after the predetermined number of inversions.

The mechanism which accomplishes the stoppering of the bottle after the drawing-out of a predetermined number of drinks therefrom is capable of a wide range of equivalents. The specific mechanisms which I have shown for this purpose are based on the operation of an escapement which is set in the starting position and is moved from the starting to the final position step by step as the stopper is alternated from the open to the stoppering position, the escapement being automatically limited, so that after a certain predetermined number of movements it cannot operate further, and which, by reason of its connection with the stopper, prevents further movement of the latter. The last position, of course, is with the stopper in position to seal the mouth of the bottle.

In Fig. 1, C is a fixed projection and D is a member, preferably a wheel, attached to the upper member B' of the stopper and which is rotatable. The cylindrical face of the member D is provided with a series of stops, such as the vertical ribs E shown, which coöperate with the relatively fixed projection C, against which they bear in turn during the rotation of the rotary member D. The rotation of D is effected by means of a spring F, Figs. 2, 3 and 4, attached at its inner end to a fixed shaft G, preferably carried by a cap H, surrounding the parts and fixed in the neck of the bottle, as hereinafter explained. The free end F' of the spring is preferably located in a groove in the inner surface of the rotary member D, so as to permit relative vertical movement of these two parts. The ribs E are interrupted at their upper and lower ends alternately, as shown, to permit the projection C to follow its path between said ribs. Starting from the position of Fig. 1, as the bottle is inverted to that of Fig. 4 the stopper B moves toward the mouth of the bottle, and the upper rib E, against which the projection C bears, is moved outward beyond the projection C, the spring F forcing the rotary member one step around, so that the next lower rib comes against the projection C. When the bottle is returned to its upright position, the projection C similarly escapes from the lower rib to bear against the succeeding upper rib, and so step by step the projection is moved along its path to the final point, where there is a final stop, such as the shoulder E' in Fig. 4, preventing further movement of the rotary member, and therefore of the stopper. With the double stopper B shown in the drawings the final position in which the stopper is held may be either that assumed in the inverted position of the bottle, in which case the member B² effects the sealing, or that assumed in the upright position of the bottle, Fig. 1, in which the member B³ effects the sealing. With a single stopper, however, the other parts remaining the same, the stop E' would be arranged to hold the stopper in the position assumed during the upright position of the bottle. In Fig. 2 the rotary member D is shown in the starting position, with the first stop E bearing against the projection C. In Figs. 3 and 4 the bottle is supposed to have been inverted the number of times necessary to completely empty it, and the last vertical stop and the horizontal stop E' are bearing against the projection C, and thereby preventing further movement vertically or under the influence of the spring F. It will be understood that the stopper in this embodiment of my invention may be integral with or otherwise attached to the rotary member D and rotates and slides on the shaft G, which is provided at the bottom with a head G' to prevent the stopper and rotary member falling too low in the upright position of the bottle.

The cap or casing H, to which the shaft G and movable parts, as well as the projection C, are attached, may be arranged in any suitable manner for insertion into the necks of bottles. One mode of accomplishing this is by the use of leaf-springs H', attached to and extending below the cap, which can be pressed inward during the insertion of the mechanism in the neck of the bottle and which will spring outward into recesses H² in such neck when they have been inserted to the proper depth. It is then impossible to remove them except by breaking the bottle, when they may be reinserted into a new bottle.

The embodiment shown in Figs. 5 to 8 differs in several details from that of Figs. 1 to 4. The same form of stopper B, composed of the members B', B², and B³, is shown as in the previous construction. The cap H is here shown as provided with springs H³ of slightly-different form, which catch into notches H⁴.

The casing also has a plate H⁵ on the under side, protecting the escapement mechanism from being tampered with. The escapement mechanism comprises a series of ribs E², similar to the ribs E, except that they are arranged directly on the inside of the casing and are fixed, while the projecting member C' is movable. The member C' is pivoted directly on the upper cylindrical portion of the shaft G' and rotates under the action of a spring F², Fig. 6, which is attached at its opposite end to an upright member K, connected to the stopper. The lower portion of the shaft G' is square, so that the stopper reciprocates thereon, but does not rotate. Through the medium of the upright K and the spring F² the reciprocations of the stopper are transmitted to the projecting member C', so as to permit it to pass one by one the ribs E² until it reaches the end of its movement at E³, Figs. 7 and 8, where it will be held down, so that the member B' closes the mouth of the bottle. The arrow in Fig. 8 shows the movement of the projecting member C' in the path formed for it by the ribs E². The number of drinks for which the bottle is to be arranged will regulate the number of ribs E² used in connection with the projection with which they coöperate, and there may be either substantially an entire circle, as shown in Figs. 2 and 3, or only a part of a circle, as shown in Figs. 6 and 8. In order to prevent the forcing of the mechanism into the mouth of the bottle, I may provide, as shown in Fig. 5, that the portion of the neck in which the stopper B reciprocates shall be of less diameter than the portion in which the casing H fits. The casing H cannot in such case be pushed below the shoulder L.

Yet another form which the escapement may take is shown in Fig. 9, in which the projection C² from any member reciprocated by the inversion of the bottle moves in a path between ribs E³, the latter being provided with inclined surfaces which engage the inclined points on the projection C², the latter being pivoted at C³ and having at opposite ends inclined faces C⁴, both of which when bearing against the inclined surfaces of the ribs E³ will force the projection C² always in the same direction, whether the projection be moving upward or downward, as is evident from the figure. E⁵ indicates the last rib adapted to prevent further reciprocation of the projection.

In the construction shown in Figs. 10, 11, and 12 a still further modification is made of the escapement, the parts not shown being similar to the corresponding parts in Fig. 5. In this case the rotary member D' rotates on the shaft G', but does not reciprocate thereon. The ribs E are arranged as in Fig. 1, and a spring F³ tends to rotate the member D' always in one direction as the projection C⁶ is reciprocated up and down by means of its connection to the stopper member B' through the upright K. When the operation has been completed, the solid portion E⁶ acts to stop further movement of the stopper member B', the same being held in its lowermost position.

The operation of the several parts of my improved bottle being now clear, I will explain briefly the mode of using the same. The bottle being filled to the desired point, the controlling mechanism is inserted from the mouth until the spring-catches take into the notches in the side of the neck and hold the whole in place. Upon inverting or tipping the bottle to the position of Fig. 7 a sufficient quantity of the liquid to make a drink of the desired size enters the space between the members B² and B' of the stopper, and as the downward movement of the liquid and the stopper is continued the member B² closes the inlet and the member B' at about the same time opens the outlet, so that the liquid between the two is permitted to escape. During this operation the liquid occupies about the position shown in Fig. 7. Simultaneously with each inversion of the bottle to the pouring position the escapement moves one step forward and another step on the return of the bottle to the upright position. The pouring of the last drink is shown in Fig. 4, in which there is no liquid remaining in the bottle and in which the escapement has moved the last step, so that on the return to the upright position the stopper member B² will continue to close the neck of the bottle, being held in position by the stop E', and will thus make it useless to refill the bottle even by boring through the bottom or in any other way. It will be seen, therefore, that the principle of the operation of my invention is extremely simple and acts in most certain manner to accomplish the end aimed at—the prevention of reusing the bottle—also that the same is secured against tampering or even a temptation to tamper with it to refill the bottle. Because of the simplicity of the principle involved the operating mechanism of my improved device is capable of modification in a great variety of ways, both as to the construction and arrangement of the details and the combinations of the various elements involved. It will be understood, therefore, that my invention is not limited to the specific embodiments hereinbefore shown and described, but that I desire to include all apparatus for accomplishing the same results by substantially the same means.

What I claim is—

1. The combination with a bottle of a stopper movably held in said bottle, and means for automatically holding said stopper in a stoppering position after the inversion of said bottle a predetermined number of times.

2. The combination with means for permitting the pouring of only a measured quantity from a bottle at each inversion thereof, of means for automatically stoppering said bottle and holding the same stoppered after a predetermined number of inversions.

3. The combination with a bottle of a stopper arranged to alternate to and from a stoppering position in the neck of said bottle, and means for automatically holding the same in the stoppering position after a predetermined number of alternations.

4. The combination with a bottle of a double stopper having stoppering members connected to each other with an intermediate space, and arranged to move in the neck of said bottle to connect such space with the interior and the exterior of the bottle alternately, and means for automatically preventing such movements thereof in excess of a predetermined number.

5. The combination with a bottle of a stopper arranged to alternate to and from a stopping position in the neck of said bottle, an escapement, means for causing a step-by-step movement of said escapement as said stopper is alternated, means for automatically preventing such movements in excess of a predetermined number, and means for holding said stopper against movement when said escapement is stopped.

6. The combination with a bottle of a stopper arranged to alternate to and from a stopping position in the neck of said bottle, an escapement comprising a projection and a member having a path of determined length for said projection, and means for causing a relative movement of said projection along its path step by step as said stopper is alternated, whereby when said projection reaches the end of its path further alternations of said stopper are prevented.

7. The combination with a bottle of a stopper arranged to alternate to and from a stopping position in the neck of said bottle, a rotary member, a spring tending to rotate the same, a series of stops preventing movement of said member by said spring, means for permitting the movement of said member by said spring from one stop to the next as said stopper is alternated, and a final stop preventing further alternation of said stopper.

8. The combination with a bottle of a stopper arranged to alternate to and from a stopping position in the neck of said bottle, a horizontally-rotating member, a spring tending to rotate the same, a series of vertical stops preventing movement of said member in a horizontal direction and interrupted at their upper and lower ends alternately, means for reciprocating said stops to permit the rotation of said member as the stopper is alternated, and a final stop preventing further alternation of said stopper.

9. The combination with a bottle of a stopper arranged to reciprocate to and from a stopping position in the neck of said bottle, a member D attached to said stopper, to reciprocate therewith, a spring arranged to rotate said member horizontally, a relatively-movable series of vertical ribs E and a relatively-fixed projection C forming an escapement for said member D, whereby as said stopper is reciprocated said escapement is operated to permit a step-by-step movement of said member D, and a final horizontal stop E' in the path of said projection preventing further reciprocation of said stopper.

10. The combination with a bottle of a double stopper B arranged to reciprocate in the neck of said bottle, a member D attached to said stopper to reciprocate therewith, a spring arranged to rotate said member horizontally, a relatively-movable series of vertical ribs E and a relatively-fixed projection C forming an escapement for said member D, whereby as said stopper is reciprocated said escapement is operated to permit a step-by-step movement of said member D, and a final horizontal stop E' in the path of said projection preventing further reciprocation of said stopper.

In witness whereof I have hereunto signed my name in the presence of two subscribing witnesses.

GEORGE LUCAS.

Witnesses:
DOMINGO A. USNIA,
FRED WHITE.